US008073934B1

(12) United States Patent
Zhong et al.

(10) Patent No.: US 8,073,934 B1
(45) Date of Patent: Dec. 6, 2011

(54) AUTOMATED LOAD BALANCING ARCHITECTURE

(75) Inventors: Nan Zhong, Bellevue, WA (US); Christopher C. Thomas, Seattle, WA (US); Venkates P. Balakrishnan, Seattle, WA (US); Sandesh A. Doddameti, Seattle, WA (US); Preetha Chatterjee, Seattle, WA (US); Erik Ackermann, Seattle, WA (US); Ameet N. Vaswani, Seattle, WA (US); Vikas Mehta, Lynnwood, WA (US); Paul L. Coleman, IV, Snoqualmie, WA (US)

(73) Assignee: Amazon Technologies, Inc., Reno, NV (US)

( * ) Notice: Subject to any disclaimer, the term of this patent is extended or adjusted under 35 U.S.C. 154(b) by 91 days.

(21) Appl. No.: 12/458,082

(22) Filed: Jun. 30, 2009

Related U.S. Application Data (60) Provisional application No. 61/136,986, filed on Oct. 20, 2008.

(51) Int. Cl.
*G06F 15/177* (2006.01)

(52) U.S. Cl. .................................... 709/220; 709/242

(58) Field of Classification Search ............... 709/220, 709/242
See application file for complete search history.

(56) References Cited

U.S. PATENT DOCUMENTS

| | | | |
|---|---|---|---|
| 2003/0028671 A1* | 2/2003 | Mehta et al. ................. | 709/245 |
| 2004/0267920 A1* | 12/2004 | Hydrie et al. ................. | 709/223 |
| 2005/0022202 A1* | 1/2005 | Sannapa Reddy et al. .... | 718/105 |
| 2006/0112170 A1* | 5/2006 | Sirkin .......................... | 709/217 |
| 2007/0011685 A1* | 1/2007 | Yim et al. ..................... | 718/105 |
| 2007/0233851 A1* | 10/2007 | Ma ................................ | 709/224 |
| 2008/0049786 A1* | 2/2008 | Ram et al. ..................... | 370/468 |
| 2008/0086369 A1* | 4/2008 | Kiat et al. ..................... | 705/14 |
| 2009/0077562 A1* | 3/2009 | Sen et al. ...................... | 718/105 |
| 2009/0327517 A1* | 12/2009 | Sivasubramanian et al. . | 709/238 |

* cited by examiner

*Primary Examiner* — Ario Etienne
*Assistant Examiner* — El Hadji Sall
(74) *Attorney, Agent, or Firm* — Thomas, Kayden, Horstemeyer & Risley, LLP (57) ABSTRACT

Systems and methods provide automated provisioning of load balancing. In one implementation, a computer-implemented method configures an access point. A request to create the access point may be received and data for the access point may be stored in a data store. The method may invoke a workflow engine. The workflow engine may assign the access point to a load balancer, configure the load balancer, assign a network address to the load balancer, and publish the network address for a plurality of clients.

23 Claims, 6 Drawing Sheets

AUTOMATED LOAD BALANCING ARCHITECTURE

RELATED APPLICATION

This application claims the benefit of priority from U.S. Provisional Application No. 61/136,986, entitled "Automated Load Balancing Architecture," filed Oct. 20, 2008, the disclosure of which is expressly incorporated herein by reference in its entirety.

BACKGROUND

A service-oriented architecture (SOA) provides resources for performing particular functions as independent services that are accessible in a standardized way over a network. The services are considered standardized because distributed program components can invoke the services without any knowledge of an underlying platform that supports the services. Communication and coordination of services with one another allows the services to perform activities for entities that are tenants of the SOA.

One example of a service in an SOA is a hosting service. The hosting service may provide resizable compute capacity so that web-scale computing is easier for developers to implement. A typical hosting service provides a developer with computers on which the developer can run applications. For example, a developer can upload applications, libraries, data, and associated configuration settings to a storage repository and, using an interface, the developer can request a number of virtual machines (i.e., server instances), on which the developer can load the applications. Each virtual machine may provide a particular level of central processing unit (CPU) capacity. The service may further allow the developer to increase or decrease how much CPU and storage capacity is needed to run the applications.

When one of the developer's applications exposes a service to a client computer, a host server is determined and performs the service. In a typical hosting service, each host server in a server fleet exposes its Internet protocol (IP) address to the client computer through a domain name system (DNS) record. Using the DNS record, the client selects a host server. For example, the client might implement a round robin technique to make the selection.

Having the client select a host server presents several disadvantages. First, the client might send a request to a host server that is already processing other requests and, as a result, the host server may experience processing delays or even fail due to receiving a large volume of traffic at one time. Second, to enable the client to select the host server, a developer must manage the DNS record that identifies available host servers and populate the record with correct network addresses of the host servers. Third, the developer must monitor the host servers and update the network addresses that are stored in the DNS record when a host server fails.

To mitigate some of the potential problems outlined above, the developer might use load balancers on the client side to balance requests across the host servers. Load balancers distribute work between two or more computers or other resources to optimize resource use, throughput, or response time. However, using a load balancer on the client side presents other challenges for the developer. In particular, the developer will need to configure and run the load balancer and, in the event of a failure of the load balancer, the developer will need to replace or repair the load balancer. Accordingly, even using a load balancer requires the developer to stay involved with the configuration, maintenance, and daily operations of the load balancer.

As is evident from the above, a typical hosting service presents several disadvantages that limit efficiency and requires a developer to expend time and resources to perform monitoring and maintenance activities. Accordingly, there is a need for improved systems and methods that allow developers to concentrate on their applications so that they do not need to spend time configuring, monitoring, and maintaining client computers and/or load balancers.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, or adding steps to the disclosed methods. Accordingly, the following detailed description is not limiting of the disclosed embodiments. Instead, the proper scope is defined by the appended claims.

Disclosed embodiments provide computer-implemented systems and methods for automated load balancing of application traffic. An application server may store system data and user data, such as applications (e.g., services) for users. An automated load balancing architecture that is consistent with disclosed embodiments may provide a management service for self-service and automated provisioning and configuration of load balancers, as well as failure detection and resolution functionality. The architecture may also provide a request routing layer that uses the load balancers to distribute application traffic to server instances.

Consistent with disclosed embodiments, the management service may provide load balancer management and configuration capabilities through a service application programming interface (API). For example, consistent with disclosed embodiments, a user may create one or more access points and register and/or deregister application instances with the access points. When the user invokes the API, one or more API servers may handle the request to create the access points. The API servers may provide frontend functionality, such as user authentication, authorization, marshalling, validation, throttling, etc. The API servers may store the requested configuration (i.e., the registered access points) to a persistent data store. Furthermore, the API server may insert an entry into an event queue. The event queue may be stored as a table in a database and the entry may include, for example, an identifier of an access point.

Consistent with disclosed embodiments, one or more workflow servers may process events in the event queue. The workflow servers may continually poll the event queue for events. When a new event is received by the event queue, one of the workflow servers may invoke a workflow engine. The workflow engine may process the event, which may involve creating an access point and/or registering one or more endpoints for the access point.

Consistent with disclosed embodiments, when a user creates a new access point, an API server may transmit configuration data to a load balancer that handles traffic for the access point. Next, the API server may assign a network address (e.g., an Internet Protocol (IP) address) to the access point. In some embodiments, the API server may assign a public network address, which is accessible over public networks, to the access point. In other embodiments, a private network address may be used as an intermediary between an external application and a public network address of an endpoint. For example, a failure of a server may cause the private network address of an endpoint to change, but the public network address may continue to be used by external applications to reach the same endpoint at a new network address. In such an embodiment, the API server may assign a private network address, which is meaningful or accessible within a particular network (e.g. a private network), to the access point. The API server may further register the network address that is assigned to an access point with a domain name system (DNS) record that represents the access point. At each step, the workflow engine may ensure that system data in the data store is accurately updated.

Consistent with disclosed embodiments, access points may be associated with DNS names. The names, along with a configured access point port, may form a unique destination that is used to interact with the user's applications. The user may use the DNS name directly or alias it to a different domain. For example, the customer may provide a DNS name and a port to client computers. When a client wants to use the application by connecting and sending traffic, the client may resolve the DNS name using a DNS server. The DNS server may return a network address for one of the load balancers for the access point. For example, the network address may be a public network address and the client computer's request may then be addressed to the public network address. A software layer may transform the public network address into a private network address and forward the request to a specific load balancer. The load balancer may then select an application instance (i.e., an endpoint) based on, for example, a load balancing algorithm, and forward the request. The application instance may then processes the request, create a reply, and send the reply back to the client via the reverse path or any other appropriate path.

Disclosed embodiments may also detect and mitigate load balancer failures. In order to do so, a failure detection server may use a fleet of pingers that continually monitor the load balancer instances. Each pinger may monitor multiple load balancers, and each load balancer may be monitored by several pingers. The workflow servers may handle assigning access points to pingers when a pinger is added or when a new access point is created. When a pinger detects a load balancer failure, the failure event may be reported to a failure analyzer. The failure analyzer may verify the failure event by querying other pingers that are monitoring the same load balancer. If the failure analyzer determines that the information is correct, it may update the system state in the data store and queue a new event in the event queue. A workflow server may then remedy the situation by remapping the network address to another load balancer.

Consistent with a disclosed embodiment, a computer-implemented method may configure an access point. The method may include receiving a request to create the access point and store data for the access point in a data store. The method may further invoke a workflow engine. The workflow engine may assign the access point to a load balancer, configure the load balancer, assign a network address to the load balancer, and publish the network address for a plurality of clients.

Consistent with another disclosed embodiment, a computer-implemented method may route a request. The method may include receiving the request. The request may include a network address for an access point. A load balancer may select an endpoint. The method may further transmit the request to the selected endpoint.

Consistent with yet another disclosed embodiment, a system may configure an access point. The system may comprise an API server. The API server may receive a request to create the access point and store data for the access point in a data store. The system may further comprise a workflow server. The workflow server may assign the access point to a load balancer, configure the load balancer, assign a network address to the load balancer; and publish the network address for a plurality of clients.

Consistent with still yet another disclosed embodiment, a system may route a request. The system may comprise a server configured to receive, from a client, the request. The request may include a network address for an access point. The system may further comprise a load balancer configured to select an endpoint and transmit the request to the selected endpoint.

Consistent with other disclosed embodiments, a computer-readable storage medium may store program instructions for implementing any of the above-described methods.

Figure 1:
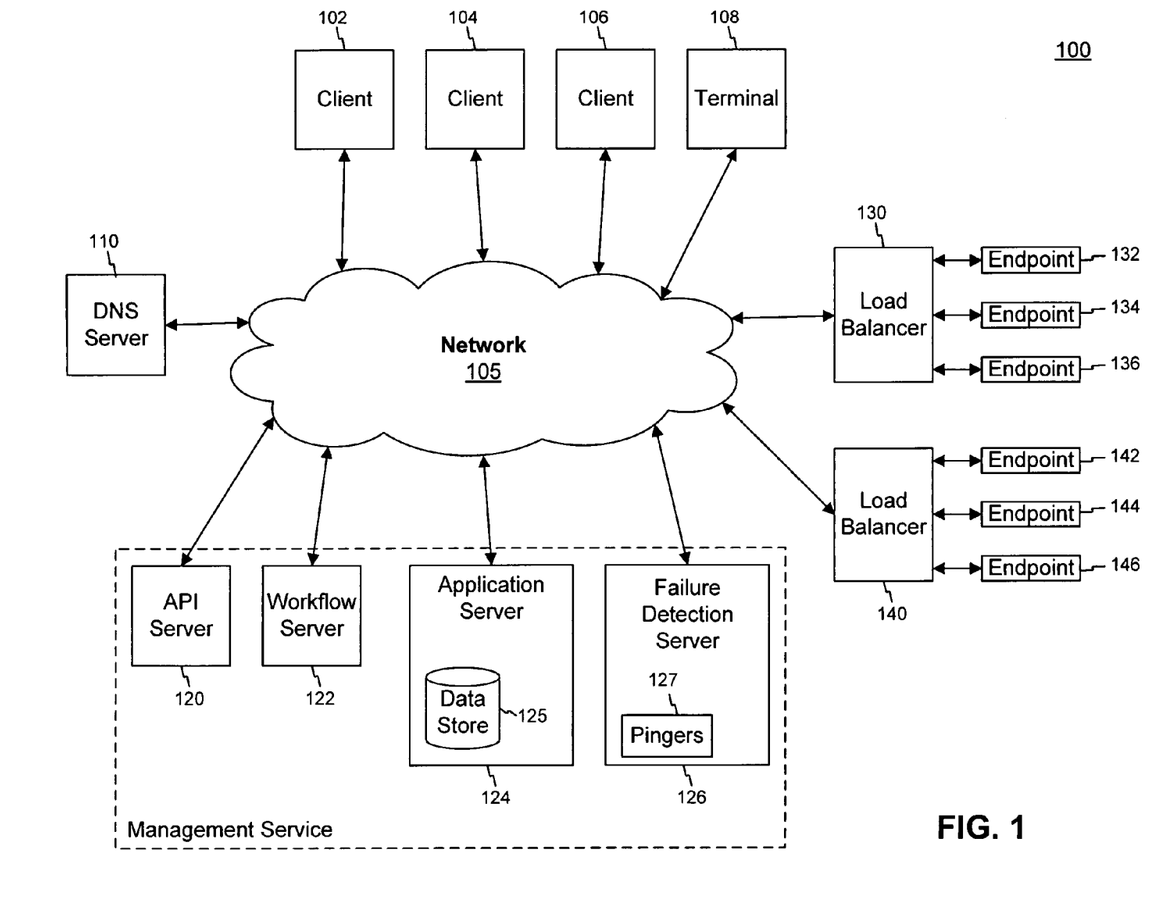
FIG. 1 is a diagram of an example of an architecture for an automated load balancing system.

FIG. 1 is a diagram of an example of an architecture for an automated load balancing system 100, consistent with a disclosed embodiment. As shown in system 100, clients 102-106, terminal 108, DNS server 110, API server 120, workflow server 122, application server 124, failure detection server 126, and load balancers 130 and 140 are connected to a network 105. Collectively, API server 120, workflow server 122, application server 124, and failure detection server 126 may provide a management service, which is discussed below in further detail. One of skill in the art will appreciate that although three clients, one user terminal, one DNS server, one API server, one workflow server, one application server, one failure detections server, and two routing servers are depicted in FIG. 1, any number of these components may be provided. One of ordinary skill in the art will also recognize that functions provided by one or more components of system 100 may be combined.

Network 105 provides communications between the various components in system 100, such as clients 102-106, terminal 108, DNS server 110, API server 120, workflow server 122, application server 124, failure detection server 126, and load balancers 130 and 140. In addition, clients 102-106, terminal 108, DNS server 110, API server 120, workflow server 122, application server 124, failure detection server 126, and load balancers 130 and 140 may access legacy systems (not shown) via network 105, or may directly access legacy systems, data stores, or other network applications. Network 105 may be a shared, public, or private network, may encompass a wide area or local area, and may be implemented through any suitable combination of wired and/or wireless communication networks. Furthermore, network 105 may comprise an intranet or the Internet.

Clients 102-106 may each comprise a general purpose computer (e.g., a personal computer, network computer, server, or mainframe computer) having one or more processors (not shown in FIG. 1) that may be selectively activated or reconfigured by a computer program. Clients 102-106 may be implemented in a distributed network. For example, clients 102-106 may communicate via network 105 with one or more additional servers (not shown), which may enable clients 102-106 to distribute processes for parallel execution by a plurality of other servers.

Terminal 108 may be any type device for communicating with API server 120 over network 105. For example, terminal 108 may be a personal computer, handheld device (e.g., PDAs, cellular phones, etc.), or any other appropriate computing platform or device capable of exchanging data with network 105. Terminal 108 may include, for example, a processor (not shown) and a memory (not shown). Furthermore, terminal 108 may execute program modules that provide one or more graphical user interfaces (GUIs) for interacting with network resources, such as API server 120.

A user (e.g., a developer) may access API server 120 over network 105 through an Internet browser or a software application running on terminal 108. For example, API server 120 may transmit a document (e.g., a web page) that is accessible by an Internet browser executing on user terminal 108. The document may include options for a user to log onto one or more secure sites provided by API server 120. Users may log onto one or more secure sites provided by API server 120, for example, by supplying credentials, such as a username (e.g., email address) and a password. Because the Internet sites may use a secure communication environment, such as an HTTPS (hypertext transfer protocol secure) environment to transfer data over network 180, data transfer is assumed to be secure.

DNS server 110 may comprise a general purpose computer (e.g., a personal computer, network computer, server, or mainframe computer) having one or more processors (not shown in FIG. 1) that may be selectively activated or reconfigured by a computer program. DNS server 110 may store DNS records in a data store (not shown). The DNS records may include network addresses (e.g., IP addresses) of servers that correspond to domain names. For example, DNS server 110 may receive HTTP (hypertext transfer protocol) requests from one or more of clients 102-106 for IP addresses for domain names. Furthermore, DNS server 110 may perform a look-up function and return IP addresses to clients 102-106.

API server 120 may comprise a general purpose computer (e.g., a personal computer, network computer, server, or mainframe computer) having one or more processors (not shown in FIG. 1) that may be selectively activated or reconfigured by a computer program. API server 120 may provide functionality for a user at terminal 108 to create and register one or more access points, which is discussed below in further detail.

Workflow server 122 may comprise a general purpose computer (e.g., a personal computer, network computer, server, or mainframe computer) having one or more processors (not shown in FIG. 1) that may be selectively activated or reconfigured by a computer program. Workflow server 122 may handle events from API server 120. For example, workflow server may include a memory (not shown) storing an event queue (not shown). Furthermore, workflow server 122 may store instructions for executing a workflow engine (not shown) for processing events that are stored in the event queue.

Application server 124 may comprise a general purpose computer (e.g., a personal computer, network computer, server, or mainframe computer) having one or more processors (not shown in FIG. 1) that may be selectively activated or reconfigured by a computer program. Application server 124 may include a data store 125 that stores user data and system data. User data may include applications, libraries, data, and associated configuration settings. System data may include data describing access points and endpoints. User data and system data may be separately stored in data store 125. Furthermore, a user may have access to and the ability to update user data, while workflow server 122 may have access to and the ability to update system data. In some embodiments, application server 124 may be omitted. For example, API server 120 and workflow server 122 may access a shared data store (not shown) available over network 105. Alternatively, a shared data store may reside in API server 120 or workflow server in lieu of providing data store 125 in application server 124.

Failure detection server 126 may comprise a general purpose computer (e.g., a personal computer, network computer, server, or mainframe computer) having one or more processors (not shown in FIG. 1) that may be selectively activated or reconfigured by a computer program. Failure detection server 126 may store instructions for providing a failure analyzer. The failure analyzer may use feedback provided from pingers 127 to monitor the health of load balancers 130 and 140.

Load balancers 130 and 140 may comprise software, hardware, or a combination of hardware and software. Each of load balancer 130 and 140 may handle traffic to a particular "zone," such as a geographic zone. For example, a user may wish to have traffic for one geographic region handled by "zone 1" and traffic for another geographic region handled by "zone 2." As another alternative, zones may refer to different entities or units of a entity. As a specific example where zones are geographic, load balancer 130 may handle traffic for a "zone 1" and load balancer 140 may handle traffic for a "zone 2." Various rules may apply when a user's applications are being processed in multiple zones. For example, a rule may require that each zone has at least one load balancer. Another rule may require that once an application request enters a zone, the load balancers in that zone do not send the request to application instances in a different zone.

Load balancers 130 and 140 may distribute traffic by random selection, round robin distribution, or may implement one or more algorithms to distribute traffic. For example, load balancers 130 and 140 may take into account factors, such as a server's reported load, recent response times, up/down status, number of active connections, geographic location, capabilities, or how much traffic a server has recently been assigned. Furthermore, as the available capacity of a single load balancer may be insufficient to meet the needs of high traffic applications, overall capacity may be increased by running multiple load balancers in parallel, each with its own IP address in the DNS record. All load balancers may function independently, with no knowledge of the existence of other load balancers, and no cross-communication for making coordinated load balancing decisions.

In network computing, the application layer, referred to as layer 7, provides conversion between application processes. An example of a layer 7 protocol is HTTP. The transportation protocol, referred to as layer 4, provides a group of methods and protocols that encapsulate data blocks into discrete units (e.g., packets) for transfer to network 104. An example of a layer 4 protocol is TCP. Load balancers 130 and 140 may provide layer 4 and/or layer 7 load balancing.

Endpoints 132-136 and endpoints 142-146 may receive traffic that has been distributed by load balancers 130 and 140, respectively. Endpoints are instances that an application runs on and accept and process traffic from clients 102-106. For example, load balancer 130 may distribute traffic to one of endpoints 132-136 and load balancer 140 may distribute traffic to one of endpoints 142-146. Endpoints 132-136 and 142-146 may each comprise computers (e.g., a personal computer, network computer, server, or mainframe computer) having one or more processors that may be selectively activated or reconfigured by a computer program. In other implementations endpoints 132-136 and 142-146 may comprise separate processors. For example, endpoints 132-136 may each comprise a processor that is included in a single server. Endpoints 132-136 and 142-146 may receive traffic routed from load balancers 130 and 140, execute an application, and return a result to one of clients 102-106. Furthermore, although FIG. 1 depicts endpoints 132-136 as being associated with one load balancer (i.e., load balancer 130) and endpoints 142-146 as being associated with one load balancer (i.e., load balancer 140), one of ordinary skill will recognize that load balancer 130 and/or load balancer 140 may comprise one or more load balancers that distribute traffic to endpoints 132-136 and endpoints 142-146, respectively. Furthermore, although load balancers 130 and 140 are shown and have been described as handling traffic for different zones, in some embodiments, load balancer 130 and load balancer 140 may both distribute traffic to one or more of endpoints 132-136 and 142-146. For example, load balancer 130 and load balancer 140 may distribute traffic irrespective of zones and endpoints 132-136 and 142-146 may be available to both load balancer 130 and load balancer 140 and/or additional load balancers (not shown).

Figure 2:
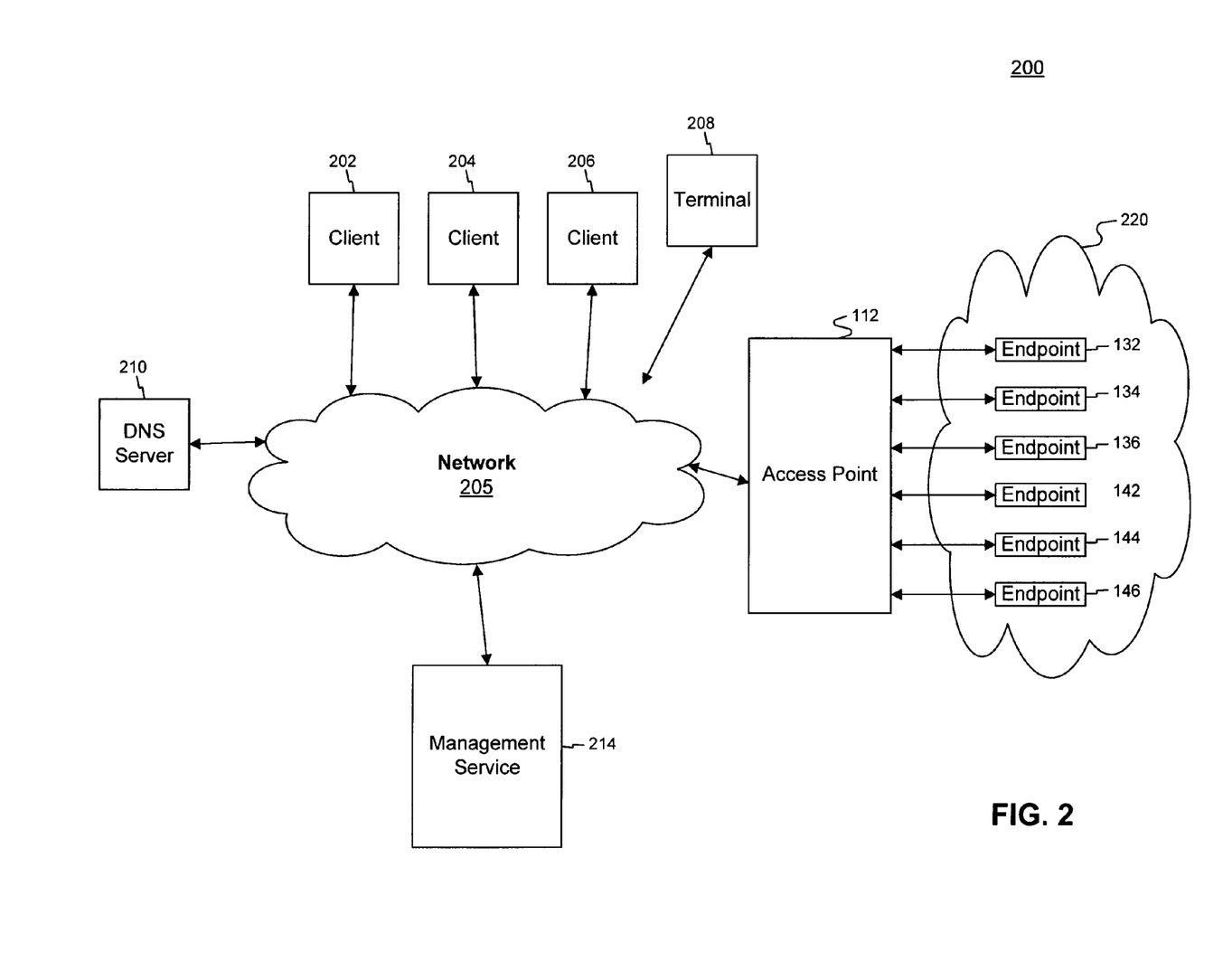
FIG. 2 is a diagram of an example of an architecture for an automated load balancing system from a user perspective.

FIG. 2 is a diagram of an example of an architecture for an automated load balancing system 200 from a user perspective, consistent with one or more disclosed embodiments. The diagram provides a view of system 100 from a user's perspective when the user provisions one or more access points for application traffic. Accordingly, like parts that were discussed in connection with FIG. 1 are given similar reference numbers in FIG. 2. As shown in system 200, clients 202-206, user terminal 208, DNS server 210, access point 212, and management server 214 are in communication with a network 205.

Clients 202-206 may be computers associated with a user and may transmit traffic (e.g., requests for services) over network 205 to an application. In particular, clients 202-206 may transmit traffic to access point 212. From the user's perspective, access point 212 provides load balancing and access to compute capacity. Access point 212 may be addressed by a name and a port. Furthermore, access point 212 may in turn route traffic to one of endpoints 132-136 and 142-146 of endpoint group 220.

Management service 214 provides self-service automation of access points to the user at user terminal 208. Using a function (e.g., CreateAccessPoint), a user may receive a unique DNS name for a new access point from management service 214. Management service 214 may set up the access point and prepare the access point for use, as discussed below in further detail. Furthermore, the user may call a function (e.g., RegisterEndPoint) to register one or more endpoints for the access point, as also discussed below in further detail.

DNS server 210 may store the IP address of the access point. Consistent with disclosed embodiments, the user may publish the DNS name for the access point to clients 202-206. When one of clients 202-206 requests an application, the client may resolve the DNS name by sending a request to DNS server 210 in order to obtain an IP address. For example, client 202 may request a service. Client 202 may then open a connection to the IP address, which may correspond to access point 212. Access point 212 may route each HTTP request (or TCP connection) to one of endpoints 132-136 and 142-146. One of endpoints 132-136 and 142-146 may then process the request and access point 212 may forward the response back to client 202. For example, access point 212 may return a result of an execution of a service. Accordingly, from the user's perspective, once a user has created access point 112 and registered endpoints 132-136 and 142-146 for access point 112, access point 112 may receives requests and forward the requests to one of end points 132-136 and 142-146 for processing.

Figure 3:
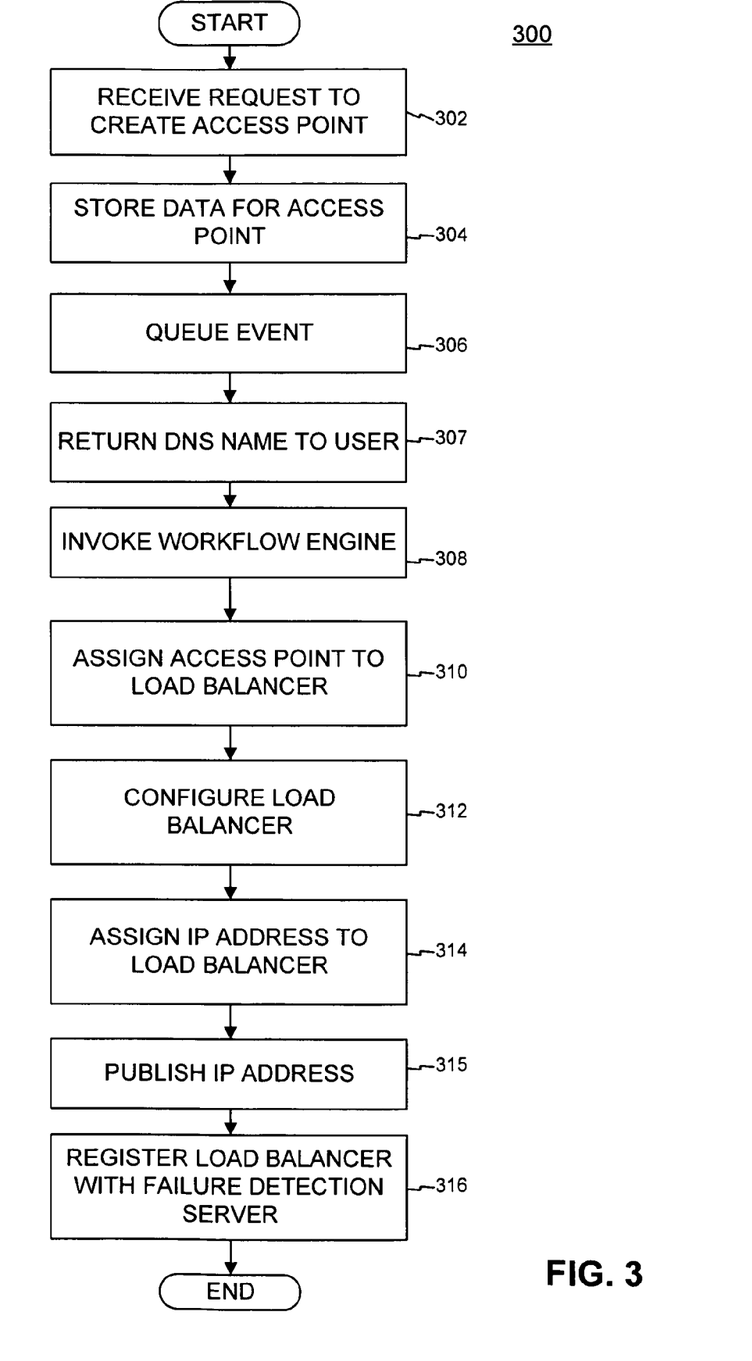
FIG. 3 is a flow diagram of an example of a routine for creating an access point.

FIG. 3 is a flow diagram of an example of a routine 300 for creating an access point, consistent with a disclosed embodiment. The following provides further details describing how the architecture shown in FIG. 1 may implement functionality to create and configure an access point that is requested by a user at, for example, terminal 108. For example, the user may configure the access point for use by one or more of clients 102-106 such that when one of clients 102-106 requests a service, the service is executed. From the user's perspective, as described in connection with FIG. 2, traffic is routed to and handled by the access point.

In block 302, API server 120 may receive a request to create an access point. API server 120 may receive the request from, for example, terminal 108. Furthermore, API server 120 may authenticate and/or validate the request in block 302.

Next, in block 304, API server 120 may store data defining the access point in an access point data store, which may be included in, for example, data store 125. The data defining the access point may include, for example, an access point identifier (ID) and an identifier of an entity (e.g., the user at terminal 108) that sent the request to create the access point.

In block 306, the workflow engine executed by workflow server 122 may queue an event containing the access point ID. For example, the workflow engine may queue the event in an event queue stored in a memory (not shown) of workflow server 122.

In block 307, API server 120 may return a DNS name for the access point to the user. For example, API server 120 may send the DNS name to terminal 108 and/or DNS server 110 may store the DNS name in a DNS record.

Next, in block 308, workflow server 122 may process the queued event. For example, workflow server 122 may cause the workflow engine to be invoked for the new access point. The following workflow process may proceed and perform functions that configure the access point.

In block 310, the workflow engine may assign the access point to a load balancer instance for each zone. For example, if the user operates in a zone 1, the workflow engine may assign the access point to load balancer 130. If the user also operates in a zone 2, the workflow engine may access the access point to load balancer 140. That is, in an embodiment in which more than one load balancer is assigned to the access point, in block 310, the on or more load balancers may each be assigned to the access point. For example, traffic originating in zone 1 for the access point may be routed to load balancer 130 and traffic originating in zone 2 for the access point may be routed to load balancer 140. Furthermore, an instance ID for each load balancer may be stored in data store 125 in association with the access point ID for the access point.

For the purposes of the following discussion, load balancer 130 is assigned to the access point. However, in the event that more than one load balancer is assigned to the access point, the following blocks may apply to more than one load balancer. For example, in an embodiment in which more than one load balancer is assigned to the access point, the following blocks 312-316 may occur substantially in parallel for each load balancer.

In block 312, workflow server 122 may transmit a current configuration to load balancer 130. The configuration may include assigning the public port of load balancer 130 to open and may include assigning load balancer 130 is to perform HTTP and/or TCP load balancing.

In block 314, workflow server 122 may assign an IP address to the load balancer. Furthermore, the IP address may be added to the DNS entry of the access point. In some embodiments, the IP address may be a public network address. In other embodiments, the IP address may be a private network address.

In block 315, the IP address for load balancer 130 may be published. For example, the IP address may be transmitted to DNS server 110 and stored as part of a DNS record for the access point. Alternatively, the IP address may be stored in a server as data or as part of a record that is accessible over network 105.

Next, in block 316, load balancer 130 may be registered with the failure detector of failure detection server 126. Accordingly, the failure detector may continuously monitor the health of all the load balancers in the system and transmit notifications to workflow server 122 if any of the load balancers have failed. Monitoring of the load balancers may be performed by pingers 127, as discussed below in further detail in connection with FIG. 6.

Figure 4:
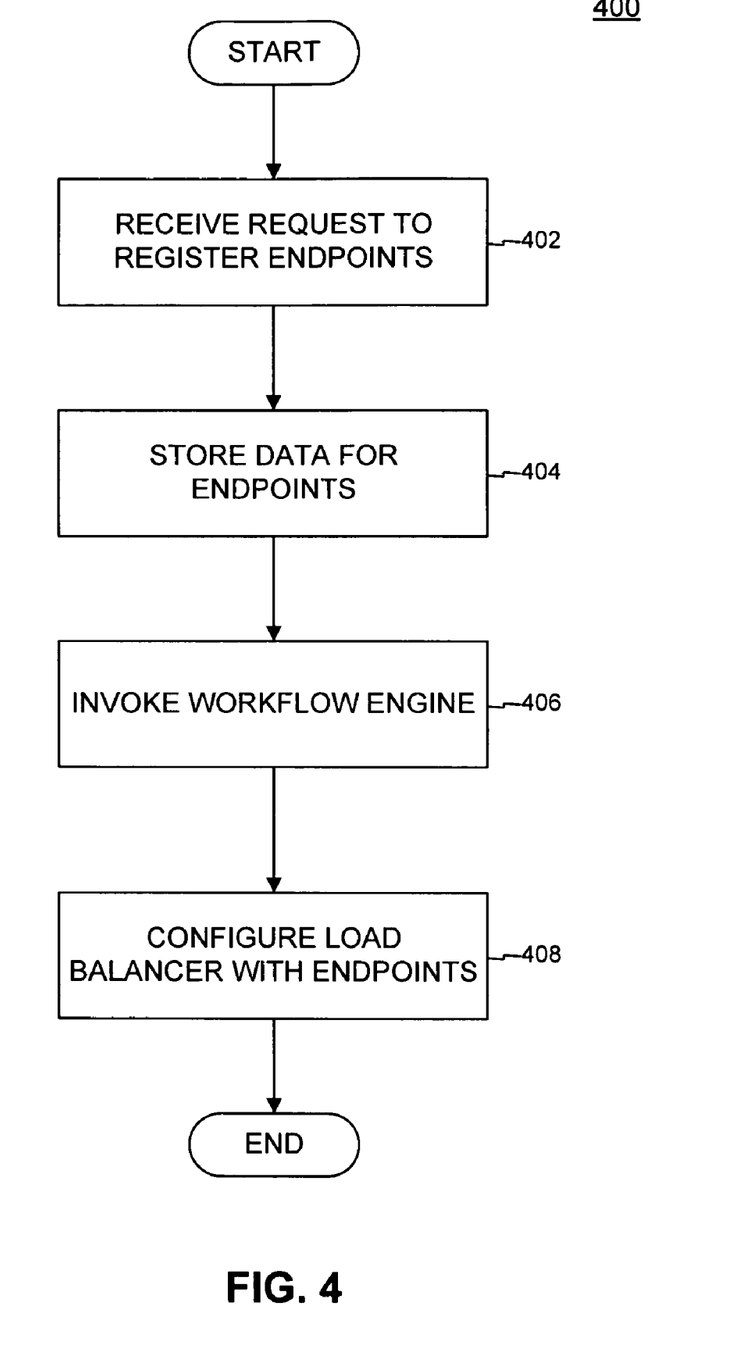
FIG. 4 is a flow diagram of an example of a routine for registering endpoints for a load balancer.

FIG. 4 is a flow diagram of an example of a routine 400 for registering endpoints for a load balancer, consistent with a disclosed embodiment. As discussed above in connection with FIG. 3, an access point is created by assigning and configuring one or more load balancers. Before clients 102-106 can send traffic to the access point, one or more endpoints are registered for the one or more load balancers.

In block 402, API server 120 may receive a request to register end points for an access point. API server 120 may receive the request from, for example, terminal 108. Furthermore, API server 120 may authenticate and/or validate the request in block 302. In the following discussion, the access point may be associated with load balancer 130, as discussed above in connection with FIG. 3.

Next, in block 404, API server 120 may store data for any new endpoints that were not previously associated with load balancer 130 in an access point data store, which may be included in, for example, data store 125. The data defining the access point may include, for example, one or more endpoint identifiers (IDs). API server 120 may additional increment the version number of the access point.

In block 406, the workflow engine that is executed by workflow server 122 may be invoked to process data, such as the endpoint IDs. For example, the workflow engine may queue an event containing the endpoint IDs. The workflow engine may queue the event in an event queue stored in a memory (not shown) of workflow server 122. Furthermore, in block 406, API server 120 may a response to the terminal 108.

Next, in block 408, the workflow engine may configure load balancer 130 with the endpoints. For example, workflow server 122 may transmit a configuration to load balancer 130 that includes a list of IP addresses of endpoints 132-136 that are to be sent traffic. As discussed above, in some embodiments, more than one load balancer may be assigned to an access point. Accordingly, in these embodiments, block 408 may configure the additional load balancers (e.g., load balancer 140) substantially in parallel.

Figure 5:
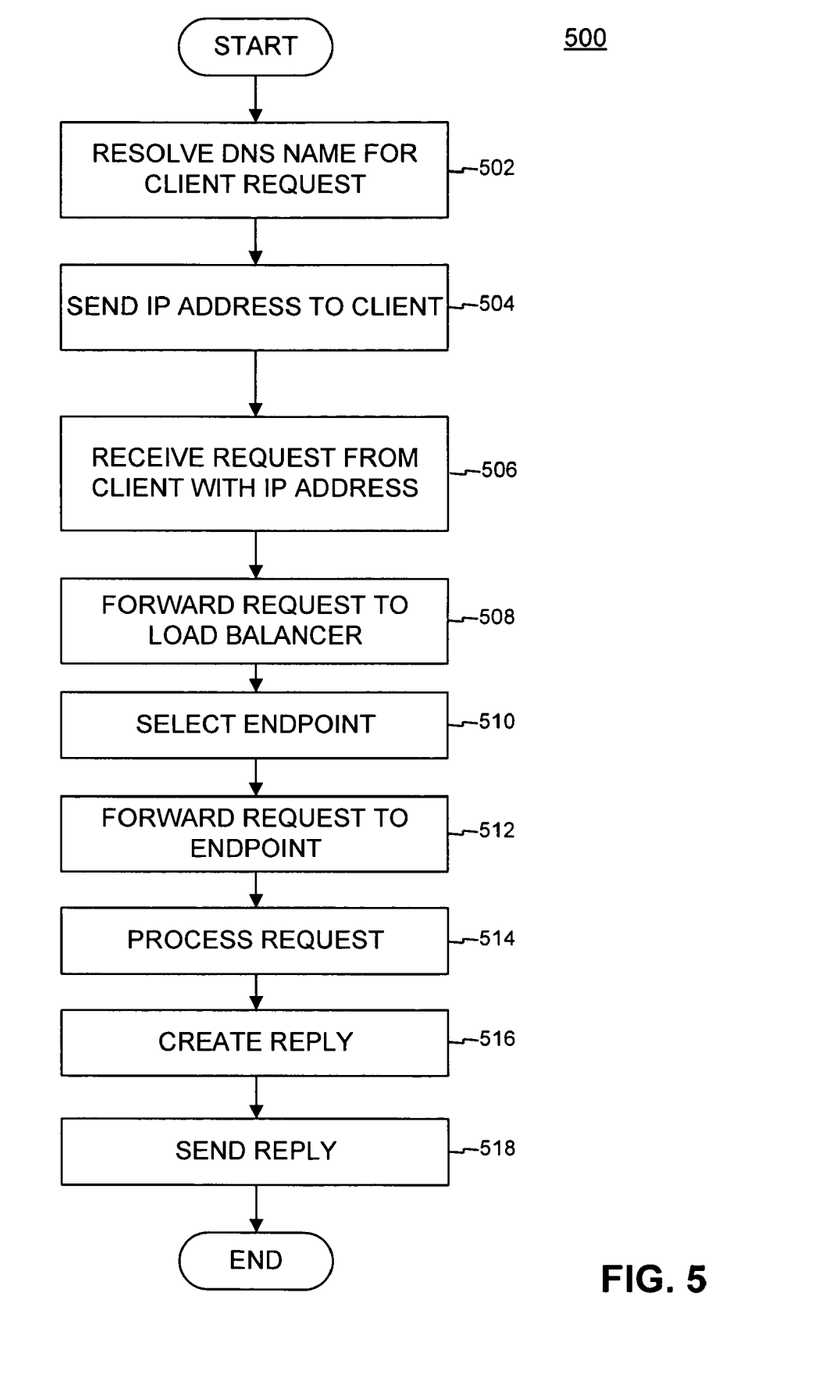
FIG. 5 is a flow diagram of an example of a routine for routing a request to an endpoint.

FIG. 5 is a flow diagram of an example of a routine 500 for routing a request to an endpoint, consistent with a disclosed embodiment. The request may originate from one of clients 102-106. For the purposes of the following example, client 102 is requesting execution of a service.

In block 502, DNS server 210 may receive the request from client 102 and resolve a DNS name included in the request. For example, the request may be for processing an order.

Next, in block 504, DNS server 210 returns an IP address to client 102. Client 102 may then route the request to the IP address. In some embodiments, the IP address may be a public network address. In some embodiments, the public network address may be transformed to a private IP address. Such a transformation is discussed in connection with block 506.

In block 506, a hosting service may receive the request and transform the public IP address into a private IP address. For example, a layer of the hosting service may transform the public IP address into a private IP address. The translation may be performed by, for example, API server 120, workflow server 122, or another server available over network 105. In other embodiments, the use of a private IP address may be omitted and the public IP address may directly correspond to a load balancer without the need for a transformation, as discussed in connection with block 506.

In block 508, API server 120 may forward the request to a load balancer corresponding to the IP address. As discussed above, the IP address may be a public network address or a private network address. For the purposes of the following example, the IP address may correspond to load balancer 130.

Next, in block 510, load balancer 130 may select one of endpoints 132-136 to process the request. For example, load balancer 130 may distribute traffic by random selection, round robin distribution, or may implement one or more algorithms to distribute traffic.

In block 512, load balancer 130 may forward the request to the selected endpoint. For the purposes of the following example, the selected endpoint may correspond to endpoint 132.

Next, in block 514, endpoint 132 may process the request. Endpoint 132 may constitute an instance that an application runs on. Accordingly, endpoint 132 may receive a request routed load balancer 130 and execute an application identified in the received request. In block 516, endpoint 132 may create a reply. In block 518, endpoint 132 may send the reply back to client 102 through a reverse path or other appropriate path. For example, endpoint 132 may send the reply directly to client 102. In such an embodiment, less load may be imposed on load balancer 130 and latency may be reduced.

Figure 6:
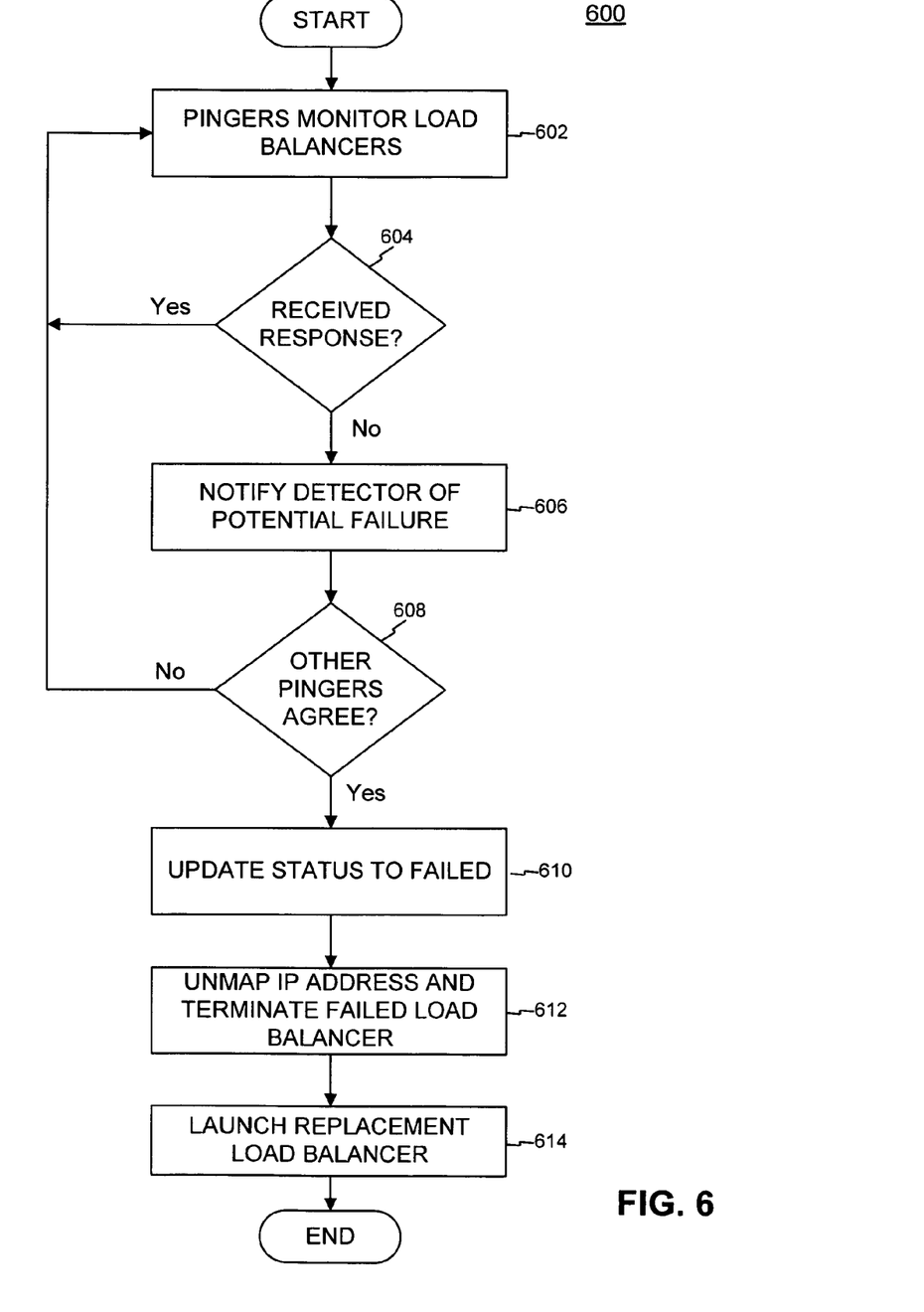
FIG. 6 is a flow diagram of an example of a routine for detecting and handling a failure of a load balancer.

FIG. 6 is a flow diagram of an example of a routine 600 for detecting and handling a failure of a load balancer, consistent with a disclosed embodiment. As discussed above in connection with FIG. 3, during the routine for creating an access point, the load balancer associated with the access point may be registered with failure detection server 126. The following routine pertains to the monitoring and handling of load balancer failures due to a hardware or software fault of the hosting service and/or the load balancer itself.

In block 602, pingers 227 may monitor the health of load balancers 130 and 140. In decision block 604, when one of pingers 227 fails to receive a response from a load balancer, the routine proceeds to block 606. If one of pingers 227 continues to receive a response from the load balancer, the routine returns to block 602.

In block 606, one of pingers 227 has not received a response from one of load balancers 130 and 140. In the following example, load balancer 130 has failed to send a response to a ping from one of pingers 227. Accordingly, the pinger sends a notification to failure detection server 126 to notify failure detection server 126 of a potential load balancer failure.

In block 608, the failure detector of failure detection server 126 analyzes the notification and confirms whether other ones of pingers 227 have observed the failure. For example, each load balancer may be pinged by multiple pingers to determine whether other pingers agree. Failure detection server 126 may consider a load balancer to have failed when a threshold percentage of pingers 227 have reported a failure of that load balancer. If a sufficient threshold number of pingers 227 agree that load balancer 130 has failed, then the process proceeds to block 610. If a sufficient threshold number of pingers 227 do not agree, then the process may return to block 602.

In block 610, failure detection server 126 may update the state of load balancer 130 to failed by storing an appropriate status in a data store, such as data store 125. Furthermore, failure detection server 126 may queue an event for workflow server 122 to handle the failure.

Next, in block 612, workflow server 122 may process the queued event by unmapping the IP address from the failed load balancer 130 and may terminate the failed load balancer instance.

In block 614, workflow server 122 may launch a replacement load balancer. For example, the processing discussed in connection with FIGS. 2 and 3 may be implemented to replace load balancer 130 with load balancer 140.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting additional blocks or deleting blocks. It is intended, therefore, that the specification and examples be considered as exemplary only, with a true scope and spirit being indicated by the following claims and their full scope of equivalents.

What is claimed is:

1. A computer-implemented method for configuring an access point, comprising:
   receiving a request to create the access point;
   storing data for the access point in a data store;
   invoking a workflow engine, wherein the workflow engine:
      assigns the access point to a load balancer;
      configures the load balancer;
      assigns a network address to the load balancer; and
      publishes the network address for a plurality of clients.

2. The computer-implemented method of claim 1, wherein the data stored for the access point in the data store comprises an access point identifier and an identifier of an entity associated with the access point.

3. The computer-implemented method of claim 2, wherein assigning the access point to the load balancer comprises:
   assigning an instance identifier to the load balancer; and
   storing the access point identifier with the instance identifier.

4. The computer-implemented method of claim 1, wherein configuring the load balancer comprises:
   assigning a public port of the load balancer to open; and
   assigning the load balancer to perform layer 4 or layer 7 load balancing.

5. The computer-implemented method of claim 1, wherein publishing the network address for the plurality of clients comprises transmitting the network address to a DNS server, the DNS server storing the network address in a DNS record.

6. The computer-implemented method of claim 1, wherein the network address is a private IP address that is used as an intermediate address for the access point.

7. The computer-implemented method of claim 1, further comprising:
   registering the load balancer with a failure detection server.

8. The computer-implemented method of claim 1, further comprising:
   registering endpoints for the access point, wherein registering endpoints for the access point comprises:
      receiving a request to register endpoints for the access point;
      storing data for the endpoints; and
      invoking the workflow engine, the workflow engine configuring the load balancer with the endpoints.

9. The computer-implemented method of claim 8, wherein the data for the endpoints comprises endpoint identifiers.

10. The computer-implemented method of claim 8, wherein configuring the load balancer with the endpoints comprises:
    storing, by the load balancer, network addresses of the endpoints.

11. A computer-implemented method, comprising:
    receiving a request to create an access point;
    invoking a workflow engine, wherein the workflow engine:
       assigns the access point to a load balancer;
       configures the load balancer;
       assigns a network address to the load balancer; and
       causes the network address to be published;
    receiving a packet, the packet comprising the network address for the access point;

selecting, by the load balancer, an endpoint; and
transmitting the packet to the selected endpoint.

12. The computer-implemented method of claim 11, further comprising:
    resolving a private network address for the network address; and
    transmitting the packet to a load balancer having the private network address.

13. The computer-implemented method of claim 11, wherein the packet is for a service.

14. The computer-implemented method of claim 11, further comprising:
    processing the packet;
    creating a reply; and
    transmitting the reply to a client.

15. The computer-implemented method of claim 11, wherein the endpoint comprises a separate server.

16. A system for configuring an access point, the system comprising:
    an API server implemented in a computing device, the API server configured to:
        receive a request to create the access point; and
        store data for the access point in a data store; and
    a workflow server configured to:
        assign the access point to a load balancer;
        configure the load balancer;
        assign a network address to the load balancer; and
        send the network address to a computing system configured to publish the network address.

17. The system of claim 16, further comprising:
    an application server, the application server configured to store the data for the access point in the data store.

18. The system of claim 16, further comprising a plurality of endpoints, wherein the workflow server is further operable to:
    receive a request to register the plurality of endpoints with the access point;
    store data for the endpoints;
    configure the load balancer with the plurality of endpoints.

19. The system of claim 18, wherein configuring the load balancer with the plurality of end points comprises:
    assigning a public port of the load balancer to open; and
    assigning the load balancer to perform layer 4 or layer 7 load balancing.

20. The system of claim 16, wherein sending the network address to the computer system comprises transmitting the network address to a DNS server, the DNS server storing the network address in a DNS record.

21. The system of claim 16, wherein the network address is a private IP address that is used as an intermediate address for the access point.

22. A system comprising:
    a server configured to:
        receive, in the server, a request to create an access point;
        store, in the server, data for the access point in a data store; and
    a workflow server configured to:
        assign the access point to a load balancer;
        configure the load balancer;
        assign a network address to the load balancer; and
        transmit the network address to a computer system configured to publish network addresses;
    the server being further configured to:
        receive, from a client, a routing request, the routing request comprising the network address for the access point; and
    the load balancer configured to:
        select an endpoint; and
        transmit the request to the selected endpoint.

23. The system of claim 22, wherein the server is further configured to:
    resolve a private network address for the network address; and
    transmit the routing request to the private network address.

* * * * *